United States Patent [19]

Steinmann et al.

[11] Patent Number: 4,743,571
[45] Date of Patent: May 10, 1988

[54] POLYCRYSTALLINE SINTERED BODIES ON A BASE OF SILICON NITRIDE WITH HIGH FRACTURE TOUGHNESS AND HARDNESS

[75] Inventors: Detlef Steinmann, Buchenberg; Alfred Lipp, Bad Worishofen; Hubert Thaler; Dietrich Lange, both of Kempten, all of Fed. Rep. of Germany

[73] Assignee: Elektroschmelzwerk Kempten GmbH, Munich, Fed. Rep. of Germany

[21] Appl. No.: 19,487

[22] Filed: Feb. 26, 1987

[30] Foreign Application Priority Data

May 23, 1986 [DE] Fed. Rep. of Germany ....... 3617282

[51] Int. Cl.$^4$ ............................................... C04B 35/58
[52] U.S. Cl. ........................................ 501/97; 501/98; 264/65; 51/309
[58] Field of Search ...................... 501/97, 98; 264/65; 51/309

[56] References Cited

U.S. PATENT DOCUMENTS

| | | | |
|---|---|---|---|
| 4,127,416 | 11/1978 | Lumby et al. | 501/98 |
| 4,218,257 | 8/1980 | Oda et al. | 501/97 |
| 4,227,842 | 10/1980 | Samanta et al. | 51/309 |
| 4,264,548 | 4/1981 | Ezis | 501/97 |
| 4,280,973 | 7/1981 | Moskowitz et al. | 264/65 |
| 4,388,085 | 6/1983 | Sarin et al. | 264/65 |
| 4,401,617 | 8/1983 | Ezis et al. | 501/98 |
| 4,628,039 | 12/1986 | Mizutani et al. | 501/97 |

Primary Examiner—William R. Dixon, Jr.
Assistant Examiner—Anthony Green
Attorney, Agent, or Firm—Burgess, Ryan & Wayne

[57] ABSTRACT

Polycrystalline sintered bodies are provided consisting of at least 66% by weight of a crystalline $Si_3N_4$ phase, of which at least 90% by weight is in the beta-modification, and of up to 34% by weight of secondary intergranular grain boundary phases of oxide, carbide and/or nitride. At least 25% by weight of the secondary grain boundary phases consists of a quasi-ternary crystalline compound in the $E_1$—$E_2$—$E_3$ triangle of the $Ga_2O_3$—$La_2O_3$-$Al_2O_3$ ternary system called "Gala", the "Gala" compound being prepared from gallium oxide, lanthanum oxide and aluminum oxide prior to producing the sintered bodies.

The polycrystalline sintered bodies are produced by sintering with and without application of pressure from silicon nitride powders having a portion of impurities not exceeding 4.0% by weight, sintering additives of oxides and optionally other refractory admixtures of carbides and/or nitrides. Powders of a quasi-ternary crystalline compound (Gala compound) are employed as at least one sintering additive prepared, prior to mixing with the remaining components and to sintering, from gallium oxide, lanthanum oxide and aluminum oxide by heating to temperatures from 1500° C. to 1850° C. When using at least 70% by weight of silicon nitride powder, there can be used up to 30% by weight of a crystalline "Gala" compound alone or mixed with other admixtures of oxides, carbides or nitrides, but altogether at least 1% by weight of a crystalline "Gala" compound must be present. The sintered bodies are especially tough and very hard and can be used for the machining of iron materials at high cutting speeds.

10 Claims, 1 Drawing Sheet

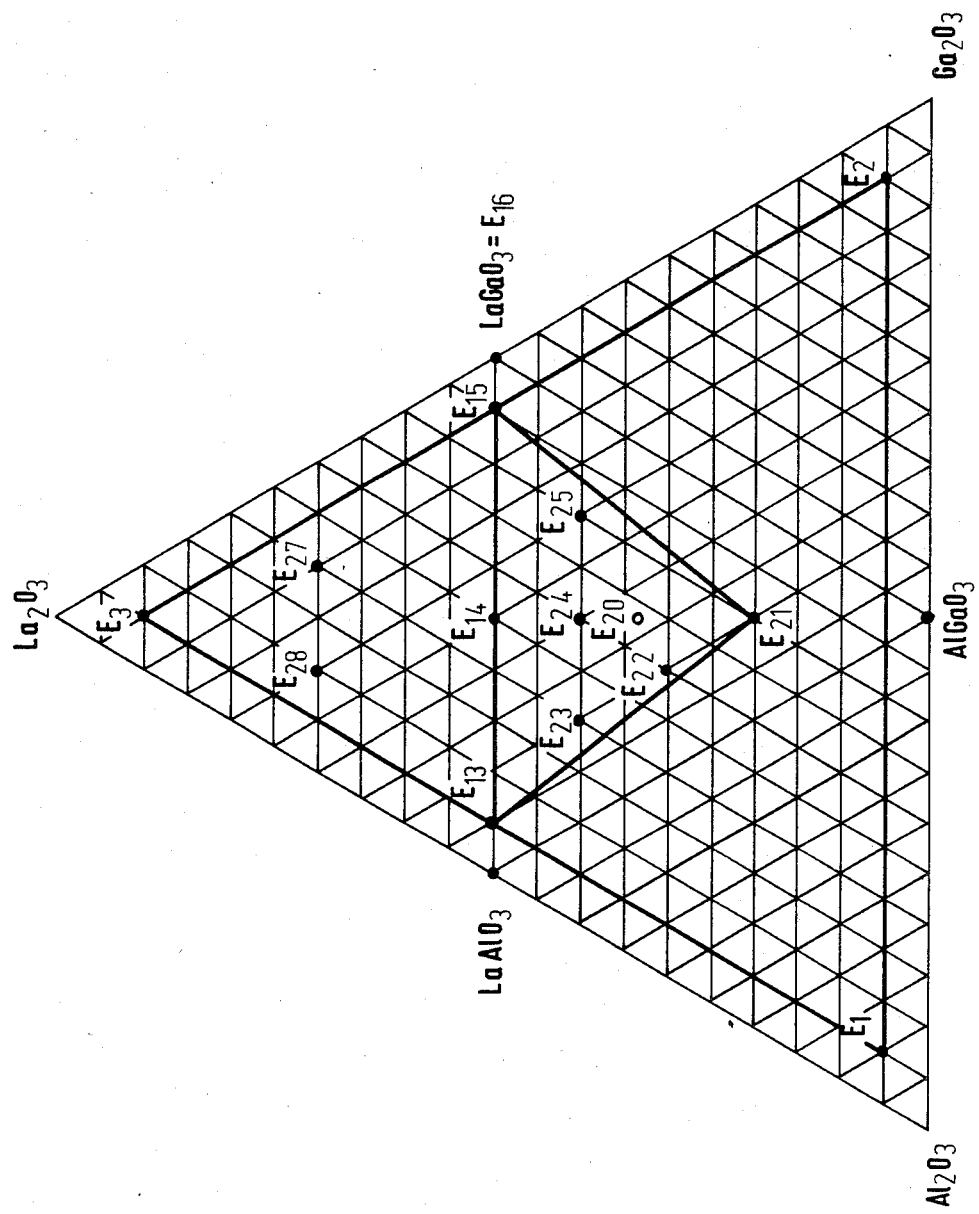

POLYCRYSTALLINE SINTERED BODIES ON A BASE OF SILICON NITRIDE WITH HIGH FRACTURE TOUGHNESS AND HARDNESS

FIELD OF THE INVENTION

This invention relates in general to polycrystalline sintered bodies. In one respect, this invention is directed to polycrystalline sintered bodies based on silicon nitride which exhibit high fracture toughness and hardness. In a further aspect, the invention is directed to a process for the preparation of the sintered bodies and their use as ceramic cutting tools.

BACKGROUND OF THE INVENTION

Polycrystalline sintered bodies based on silicon nitride have, in the last few years, acquired increased importance in the field of ceramic cutting materials. These materials are made of silicon nitride and sintering additives, of mixtures of silicon nitride and other refractory compounds based on oxides, carbides and/or nitrides, and of the sialones in which Si and N atoms in the $Si_3N_4$ are partially replaced by Al and O atoms forming solid solutions of Si—Al—O—N of different composition.

Sintered bodies produced by sintering without applying pressure from powder mixtures of $Si_3N_4$ and sintering additives based on oxides such as MgO, $Al_2O_3$ or $Y_2O_3$ in the form of presintered mixed oxides of the Spinel type are already known as cutting materials for hypereutectic Al-Si alloys (see JP-Kokai 74, 133, 803 ref. in Chem, Abstr. Vol. 84 (1976), No. 21 440 t).

Sintered bodies of the kind discussed above, however, do not have sufficient resistance to high temperatures, since the secondary phases present in the grain boundaries are predominantly vitreous and become soft at high temperatures. For this reason, they are not adequate as cutting materials under intensified conditions such as for machining iron materials.

Sintered bodies produced by hot pressing powder mixtures of $Si_3N_4$ and oxides such as MgO, $ZrO_2$ and $Y_2O_3$ employing specific pressure and temperature conditions should, however, be capable of providing improved cutting materials if the amounts of admixed oxides are selected in a manner such as not to be present in the grain boundaries of the $Si_3N_4$ matrix in Spinel form but to form small amounts of a stable, refractory oxynitride and/or silicate (See EP-A-No. 98 59 and U.S. Pat. No. 4,227,842). Besides, the formation of secondary crystalline grain boundary phases, which substantially consist of ytrrium silicon oxynitrides, must be aided by admixing other substances in small amounts such as $Al_2O_3$, WC, or TiC (see U.S. Pat. No. 4,401,617) or can be obtained by an additional heat treatment of the sintered bodies (see DE-A-No. 30 47 255, corresponding to U.S. Pat. No. 4,264,548). If the sintered bodies are produced without applying pressure, the presence of a third substance such as $Al_2O_3$, WC, $WSi_2$, W and TiC is necessary in the starting powder mixture of $Si_3N_4$ and oxide admixtures (see DE-A-No. 30 39 827 corresponding to U.S. Pat. No. 4,280,973).

Cutting materials produced by sintering with or without application of pressure from powder mixtures of $Si_3N_4$, oxide sintering adjuvants and refractory admixtures in amounts of up to about 40% by weight of carbide (for instance, TiC) or nitride, or mixtures thereof, are known (see U.S. Pat. No. 4,388,085).

For the production of high-efficiency small cutting plates, the sialones have recently become known and can be prepared with or without application of pressure from powder mixtures of $Si_3N_4$, AlN and $Al_2O_3$ together with an oxide sintering adjuvant such as $Y_2O_3$. These materials distinguish themselves by an improved resistance to high temperatures by which it is understood that the rupture modulus at 1200° C. drops only slightly compared to the value measured at room temperature when after terminating the sintering operation care is taken, by a controlled gradual cooling or by a subsequent heat treatment, so that at least part of the glass in the intergranular vitreous grain boundary phases crystallizes as a ceramic phase containing, for instance, a Y-Al-garnet (see DE-C-No. 27 33 354 corresponding to U.S. Pat. No. 4,127,416).

However, it has been found that the cutting materials based on $Si_3N_4$, according to the prior art, possess only in part the requirements relative to the properties that characterize the ideal cutting materials. Although they are in general dense, resistant to bending, oxidation and thermoshock, they are basically not sufficiently tough to withstand for long period of time without breaking, particularly without chamfering, the sudden and unexpected stresses that occur, for instance, when used as small cutting plates in continuous cutting.

Thus, the problem that presents itself is to provide polycrystalline sintered bodies based on silicon nitride, sintering additives on an oxide base and optionally other refractory admixtures based on carbide and/or nitride, which bodies distinguish themselves by combining the properties of great hardness with great fracture toughness, and that they are specially wear-resistant in order better to satisfy what is required of ceramic cutting materials for the machining of iron materials at high cutting speeds.

THE DRAWINGS

The single drawing is a phase diagram depicting the ternary system, $Ga_2O_3$, $La_2O_3$ and $Al_2O_3$.

SUMMARY OF THE INVENTION

According to the invention, this problem is solved providing polycrystalline sintered bodies consisting of at least 66% by weight of a crystalline $Si_3N_4$ phase of which at least 90% by weight is present in the beta modification and of up to 34% by weight secondary, intergranular grain boundary phases based on oxides, carbides and/or nitrides of which at least one is crystalline, at least 25% by weight of the intergranular secondary grain boundary phases consists of a quasi-ternary crystalline compound of $Ga_2O_3$, $La_2O_3$ and $Al_2O_3$, of which the quantitative portions in % by mole in the ternary system $Ga_2O_3$—$La_2O_3$—$Al_2O_3$ are determined by the triangular surface with the corners $E_1 = 5\% Ga_2O_3$—$5\% La_2O_3$—$90\% Al_2O_3$
$E_2 = 90\% Ga_2O_3$—$5\% La_2O_3$—$5\% Al_2O_3$
$E_3 = 5\% Ga_2O_3$—$90\% La_2O_3$—$5\% Al_2O_3$ and the quasi-ternary crystalline compound (hereinafter called "Gala"-compound) is prepared from gallium oxide, lanthanum oxide and aluminum oxide prior to producing the polycrystalline sintered body.

DETAILED DESCRIPTION OF THE INVENTION

The polycrystalline sintered bodies according to the invention can be produced in a manner known per se by sintering powder mixtures of $Si_3N_4$, oxide sintering additives and optionally other refractory admixtures based on carbides and/or nitrides, with or without applying pressure, at temperatures in the range of from 1700° C. to 2100° C. with the proviso that at least one sintering additive is a quasi-ternary, crystalline compound of $Ga_2O_3$, $La_2O_3$ and $Al_2O_3$ of which the quantitative portions in % by mole, in the ternary system $Ga_2O_3$—$La_2O_3$—$Al_2O_3$ is determined by the triangular surface with the corners $E_1$, $E_2$, $E_3$ and preferably by the triangular surface with the corners $E_{13} = 5\% Ga_2O_3$—$50\% La_2O_3$—$45\% Al_2O_3$
$E_{15} = 45\% Ga_2O_3$—$50\% La_2O_3$—$5\% Al_2O_3$
$E_{21} = 40\% Ga_2O_3$—$20\% La_2O_3$—$40\% Al_2O_3$ The sintering additive is prepared prior to the mixing with the remaining components and prior to the sintering, from gallium oxide, lanthanum oxide and aluminum oxide in the above defined amounts by heating to temperatures of from 1500° C. to 1850° C.

Starting materials are preferably homogeneous powder mixtures having an average particle size of $<2$ μm consisting of at least 70% by weight silicon nitride, of which at least 80% by weight is present in the alpha modification, having a portion of impurities in the form of oxides and free carbon not exceeding 4.0% by weight, and of up to 30% by weight of the powder of a "Gala" compound alone or mixed with known admixtures of oxides and/or carbides or nitrides; a total of at least 1% by weight of the "Gala" compound must be present.

Commercially available powders of the usual fineness and purity can be used as the silicon nitride powder that is, neither specially fine nor specially pure powder qualities are required, with maximum particle sizes of up to about 15 μm, that is, with a specific surface in the range of about 3 to 20 $m^2/g$ (measured according to BET). Standard values that can be tolerated for the impurities in the $Si_3N_4$ powders are:

$CaO \leqq 0.4\%$ by weight
$MgO \leqq 0.2\%$ by weight
$Na_2O \leqq 0.1\%$ by weight
$K_2O \leqq 0.1\%$ by weight
$Li_2O \leqq 0.1\%$ by weight
$Al_2O_3 \leqq 1.1\%$ by weight
$Fe_2O_3 \leqq 1.5\%$ by weight
$TiO_2 \leqq 0.1\%$ by weight and
$C_{free} \leqq 0.4\%$ by weight When employing mixtures from the powder of a "Gala" compound and admixtures with oxides, there are advantageously used those from the groups of the crystalline silicates of natural or synthetic origin, of the metal oxides with metal atoms from groups 2a and 3b of the Periodic System, including lanthanides and aluminum, and of the silicon-aluminum oxynitrides.

Examples of crystalline silicates are those having melting points in the range of from 1350° C. to 1950° C. from the group of the neso-, soro-, cyclo-, ino-, phyllo- and tectosilicates, with the exception of quartz, which according to German Patent Application No. P 34 23 573.6, filed on June 27, 1984, have been proposed as sintering additives together with metal carbides for the production of polycrystalline sintered bodies based on silicon nitride.

Special examples are Ca-Mg silicates of natural origin such as $Ca_2Mg(Si_2O_7)$ (Akermanite) and Y—N silicates of synthetic origin such as $YAlN(SiO_5)$ prepared from $AlN \times SiO_2Y_2O_3$.

Examples of metal oxides are MgO, $Y_2O_3$, oxides of the lanthanides and $Al_2O_3$ including mixed oxides from $Y_2O_3$ and $Al_2O_3$ such as $Y_4Al_2O_9$ and $Y_6Al_{10}O_{24}$.

Examples of silicon-aluminum oxynitrides are those having the following composition:

$SiAl_4O_2N_4$, $SiAl_5O_2N_5$, $SiAl_6O_2N_6$, $SiAl_8O_2N_8$ and $Si_{0.5}Al_{3.5}O_{2.5}N_{2.5}$.

When employing mixtures from the powder of a "Gala" composition and refractory admixtures based on carbides and/or nitrides, there are advantageously used those from the group of the metal carbides with metal atoms, from Groups 4b, 5b and 6b of the Periodic System, the same as B and Si, and from the titanium nitride and titanium carbonitride group.

Examples of metal carbides are TiC, ZrC, WC, TaC, CrC, VC, the same as $B_4C$ and SiC.

When using the above mentioned mixtures, the amounts of the crystalline powder of a "Gala" compound, independently of whether admixtures comprising oxides or carbides/nitrides are used, must be measured in a manner such that in the finished sintered body, according to definition, at least 25% by weight of all secondary phases present consist of a crystalline "Gala" compound. The impurities present in the $Si_3N_4$ powder also have to be taken into consideration.

The portion of the crystalline "Gala" compound mixed with admixtures of carbide/nitride materials preferably amounts to at least 30% by weight to about 70% by weight and mixed with admixtures of oxides to at least 30% by weight to about 60% by weight.

For producing the crystalline sintered bodies according to the invention, the $Si_3N_4$ powders together with the selected admixtures are homogeneously blended by means of well-known processes. The homogeneous blending is preferably carried out by grinding in the presence of an organic solvent such as methanol, toluene or cyclohexane. However, instead of the finished starting powder, the admixtures can also be homogeneously ground with the Si powder and then nitrified. A specially uniform distribution of the admixtures in the $Si_3N_4$ is thereby obtained. After terminating the nitridation, it is preferred to employ an additional grinding step in order to ensure the required average particle size of $<2$ μm in the starting powder mixture.

These homogeneous starting powder mixtures are then sintered by known methods with or without application of pressure. The process parameters such as temperature, dwelling time and, optionally, pressure are preferably selected so as to be sufficient to provide a dense body and for the practically complete conversion of the alpha modification of the $Si_3N_4$ to the beta modification. For the separate sintering process, the following parameters have provided specially satisfactory sintered bodies:

1. Sintering without applying pressure in a powder bed of $Si_3N_4$ or $Si_3N_4$ and BN: maximum temperature 1850° C.; dwelling time depending on the wall thickness of the body to be sintered of 10 to 40 mm: from 1 to 6 hours;

2. Sintering under stationary nitrogen pressure of at least 2 MPa; maximum temperature 2100° C.; dwelling time for wall thicknesses of 10 to 40 mm: from 1 to 3 hours;

3. Hot pressing under stamping pressure in the presence of nitrogen under normal pressure or under vacuum; maximum temperature 1800° C.; dwelling time for a wall thickness of 10 to 40 mm: from 1 to 1.5 hours;

4. Hot isostatic pressing under nitrogen pressure of up to 200 MPa; maximum temperature 1850° C.; dwelling time for a wall thickness of 10 to 40 mm: from 1 to 1.5 hours.

The polycrystalline sintered bodies produced according to the invention using a crystalline "Gala" compound have, independently of the particular sintering method, a density of more than 96% of the theoretically possible density, which can reach 100% when using the pressure sintering method. They are characterized by the combination of the following properties:

1. relatively low elastic modulus (E modulus) in the range of from 250–310 KN/mm$^2$ measured at room temperature, which serves as standard for good resistance to thermoshock;

2. high mechanical strength at room temperature and slight decrease in strength with the temperature demonstrated by a bending strength at room temperature of at least 600 N/mm$^2$, measured according to the 4-point method, that up to 1100° C. decreases less than 30%, preferably less than 25%;

3. great hardness at room temperature and slight decrease of hardness with temperature demonstrated by HK2 values of from 1600 to 2000 at room temperature measured according to Knoop with a load of 19.62N, which up to 1100° C. decreases less than 45%, preferably less than 40%;

4. great fracture toughness demonstrated by $K_{IC}$ values of at least 7.0 MN/m$^{3/2}$ measured according to the 4-point method at 50% notch depth and a rate of load application of 500N/min.

They have, in addition, a microstructure consisting of needle-like $Si_3N_4$ crystals having a maximum grain diameter of 5 μm and a ratio of grain length to grain diameter of from 4:1 to 7:1 and of homogeneously distributed secondary phases visible in the polished surface in facets of less than 10 μm$^2$. The presence of a crystalline "Gala" compound in these secondary phases is radiographically detectable.

As a result of this combination of properties, the polycrystalline silicon nitride sintered bodies produced according to the invention using a crystalline "Gala" compound, are clearly superior to those of the prior art as ceramic cutting materials for the machining of iron materials at high cutting speeds. In the examples that follow, there have been examined in machining tests under different conditions sintered bodies in which the admixture of a crystalline "Gala" compound, according to the invention, has been used and those in which it has not been used and the superiority of the cutting materials according to the invention has been demonstrated.

EXAMPLES (A) Preparation of the quasi-ternary crystalline compounds in the $Ga_2O_3 La_2O_3$—$Al_2O_3$ system.

$Ga_2O_3$, $La_2O_3$ and $Al_2O_3$ were blended with acetone according to the compositions characterized in the ternary system, that is, in the characterized triangle $E_1$—$E_2$—$E_3$, preferably in the characterized triangle $E_{13}$—$E_{15}$—$E_{21}$ in % mole (see FIG. 1). After drying and screening (to less than 40 mesh), the anhydrous, homogeneous powder mixture was heated in the range of from 1500° C.–1850° C. in an adequate crucible under oxidizing conditions, also under protective gas if desired, and was held for 15–30 minutes at said temperature. X-ray investigation shows that the heat treatment has produced a substantially monophase substance. After cooling, the quasi-ternary crystalline compounds thus produced were ground to the required particle size of <2 μm in a planetary ball mill having grinding containers and grinding balls of silicon nitride and using cyclohexane as a grinding fluid.

(B) Preparation of the polycrystalline sintered bodies according to the invention:

Example 1

The $Si_3N_4$ starting powder used in the examples had the following analysis:

| | |
|---|---|
| alpha-$Si_3N_4$ | 87% by weight |
| beta-$Si_3N_4$ | 2.5% by weight |
| $O_2$ | 1.63% by weight |
| C | 0.21% by weight |
| Al | 0.15% by weight |
| Fe | 0.21% by weight |
| Ca | 0.14% by weight |
| Mg | ≦0.05% by weight |
| Zr | ≦0.05% by weight |
| Ti | 0.02% by weight |
| Na | ≦0.02% by weight |
| K | ≦0.02% by weight |
| $N_2$ | 36.05% by weight |
| spec. surface (BET) | 3.7 m$^2$/g |

The $Si_3N_4$ powder was homogeneously blended for 1 to 5 hours with the crystalline "Gala" compounds prepared according to A and, if desired, with other admixtures in a planetary ball mill having a grinding container and grinding balls of silicon nitride and using cyclohexane as grinding fluid. The cyclohexane was then removed by evaporation and the powder mixture stripped of large agglomerated particles by screening (through a 40 mesh screen). The powder mixture was then molded by known molding processes (cold isostatic pressing, die pressing, or casting) and sintered in a known manner.

In Table 1 are compiled the amounts of the silicon nitride starting powder and of the admixtures in percent by weight, the period of grinding in hours, the sintering process used and the sintering densities obtained in g/cc.

The compositions of the "Gala" compounds in % by mole correspond to the points E are shown in FIG. 1

TABLE 1

| Sample No. | % $Si_3N_4$ | % "Gala" compounds | % carbide | Grinding period hr | Sintering process | Density in g/cc |
|---|---|---|---|---|---|---|
| 1 | 90 | 10 $E_{13}$ | — | 1 | HP | 3.25–3.28 |
| 2 | 92 | 8 $E_{14}$ | — | 1 | $N_2$ pressure | 3.24–3.27 |
| 3 | 95 | 5 $E_{15}$ | — | 2 | DLS | 3.22–3.24 |
| 4 | 80 | 10 $E_{23}$ | 10 $Cr_3C_2$ | 5 | HP | 3.38 |
| 5 | 80 | 10 $E_{24}$ | 10 ZrC | 5 | HP | 3.40–3.42 |
| 6 | 80 | 10 $E_{25}$ | 10 VC | 1 | HP | 3.37–3.39 |
| 7 | 80 | 10 $E_{22}$ | 10 TaC | 5 | $N_2$ pressure | 3.49–3.52 |
| 8 | 80 | 10 $E_{20}$ | 10 TiC | 5 | DLS | 3.38–3.40 |

TABLE 1-continued

| Sample No. | % Si₃N₄ | % "Gala" compounds | % carbide | Grinding period hr | Sintering process | Density in g/cc |
|---|---|---|---|---|---|---|
| 9 | 70 | 10 E$_{21}$ | 20 TiC | 5 | DLS | 3.44–3.46 |

Wherein:
  HP=hot pressed under stamping pressure, spec. amount of pressure applied: 35 MPa temperature: 1800° C.; dwelling period: 1 hr
  N₂ pressure=sintered under stationary N₂ pressure of 6 MPa; temperature: 1900° C.; dwelling period: 3 hr
  DLS=sintered without pressure in a powder bed of BN/Si₃N₄ mixture temperature: 1800° C. dwelling period: 6 hrs Example 2

Sintered bodies were produced from the silicon nitride starting powder used in Example 1, the "Gala" compounds prepared according to A and, if desired, other admixtures on oxide, carbide or nitride base and said sintered bodies were analyzed with regard to their properties.

As a control, there were used sintered bodies produced under the same conditions but without the admixture of the "Gala" compounds according to the invention.

In Table 2 there are compiled the amounts of the Si₃N₄ starting powder and of the admixtures in percent by weight for the production of the sintered bodies and the properties of said sintered bodies.

E-modulus=Youngs-modulus in KN/mm² measured at room temperature;
BF$_{RT}$=bending strength in N/mm² measured at room temperature according to the 4-point method;
BF$_{1100}$=bending strength in N/mm² measured at 1100° C. according to the 4-point method;
HK2$_{RT}$=hardness measured at room temperature according to Knoop with a load of 19.62N;
HK2$_{1100}$=hardness measured at 1100° C. according to Knoop with a load of 19.62N. This analysis of hardness is a modification of the hardness test according to Vickers (DIN 50133) in which a diamond pyramid with a slim, rhombic base was used as the almost knife-shaped body forced into the material under the indicated load.
K$_{IC}$=fracture toughness in MN.m$^{-3/2}$ measured according to the 4-point method on small notched specimen (size 2×4×34 mm); the notch depth was 2 mm(=50%) and the notch width to 0.1 mm; the rate of load application was 500N/min.

(C) Analysis of the sintered bodies in machining tests:
The sintered bodies E 1 to E 15 produced in Example 2 according to the invention and the sintered bodies V 1 to V 9 produced for comparison were tested in machining tests as follows:

TABLE 2

| Sample No. | Si₃N₄ % | "Gala" compounds | Carbide/ Nitride % | Oxide % | E-modul KN/mm² | BF$_{RT}$ N/mm² | BF$_{1100}$ N/mm² | HK2$_{RT}$ | HK2$_{1100}$ | K$_{IC}$ MN/m$^{3/2}$ |
|---|---|---|---|---|---|---|---|---|---|---|
| E 1 | 90 | 10 E$_{20}$ | — | — | 305 | 767 | 589 | 1780 | 1301 | 8.1 |
| V 1 | 90 | — | — | 3,05 Ga₂O₃ 5,30 La₂O₃ 1,65 Al₂O₃ | 319 | 627 | 289 | 1382 | 768 | 5.8 |
| E 2 | 90 | 5 E$_{13}$ | — | 2 Al₂O₃ + 3 Y₂O₃ | 310 | 751 | 561 | 1690 | 1165 | 7.4 |
| V 2 | 90 | — | — | 2 Al₂O₃ + 8 Y₂O₃ | 320 | 657 | 346 | 1538 | 726 | 6.0 |
| E 3 | 89 | 5 E$_{14}$ | — | 6 Y₂O₃ | 304 | 802 | 590 | 1690 | 990 | 8.0 |
| V 3 | 89 | — | — | 11 Y₂O₃ | 319 | 819 | 600 | 1684 | 898 | 6.7 |
| E 4 | 88 | 5 E$_{15}$ | 2 TiN | 5 Y₂O₃ | 303 | 762 | 576 | 1800 | 1190 | 7.7 |
| V 4 | 88 | — | 2 TiN | 10 Y₂O₃ | 323 | 704 | 498 | 1710 | 888 | 6.1 |
| E 5 | 82 | 10 E$_{14}$ | 3 WC | 5 Ca₂Mg(Si₂O₇) | 265 | 761 | 584 | 1675 | 1200 | 7.3 |
| V 5 | 92 | — | 3 WC | 5 Ca₂Mg(Si₂O₇) | 278 | 690 | 495 | 1538 | 888 | 7.1 |
| E 6 | 78 | 10 E$_{23}$ | — | 5 SiAl₄O₂N₄ + 7 Y₆Al₁₀O₂₄ | 294 | 728 | 602 | 1596 | 995 | 7.2 |
| V 6 | 88 | — | — | 5 SiAl₄O₂N₄ + 7 Y₆Al₁₀O₂₄ | 317 | 621 | 404 | 1562 | 831.2 | 6.0 |
| E 7 | 77.5 | 10 E$_{21}$ | 0.5 VC | 12 YAlN(SiO₅) | 277 | 704 | 676 | 1802 | 1265 | 7.6 |
| V 7 | 87.5 | — | 0.5 VC | 12 YAlN(SiO₅) | 293 | 914 | 602 | 1610 | 940 | 7.1 |
| E 8 | 75 | 10 E$_{25}$ | 5 TaC | 5 SiAl₈O₂N₈ + 5 Y₆Al₁₀O₂₄ | 308 | 700 | 561 | 1834 | 1194 | 7.8 |
| V 8 | 80 | — | 5 TaC | 5 SiAl₈O₂N₈ + 10 Y₆Al₁₀O₂₄ | 322 | 589 | 381 | 1634 | 940 | 6.1 |
| E 9 | 70 | 10 E$_{24}$ | 10 TiC | 5 SiAl₆O₂N₆ + 5 Y₆Al₁₀O₂₄ | 307 | 698 | 597 | 1716 | 1220 | 7.5 |
| V 9 | 75 | — | 10 TiC | 5 SiAl₆O₂N₆ + 10 Y₆Al₁₀O₂₄ | 325 | 611 | 403 | 1610 | 996 | 5.9 |
| E 10 | 85 | 10 E$_{20}$ | 5 SiC | — | 299 | 719 | 593 | 1690 | 1020 | 7.2 |
| E 11 | 85 | 10 E$_{13}$ | 5 B₄C | — | 301 | 655 | 581 | 1634 | 1045 | 7.3 |
| E 12 | 85 | 10 E$_{13}$ | 5 CrC | — | 303 | 722 | 604 | 1592 | 1112 | 7.8 |
| E 13 | 85 | 10 E$_{14}$ | 5 ZrC | — | 303 | 713 | 596 | 1610 | 1140 | 7.4 |
| E 14 | 80 | 10 E$_{28}$ | 10 VC | — | 305 | 610 | 539 | 1710 | 1216 | 7.7 |
| E 15 | 70 | 10 E$_{20}$ | 10 VC + 10 TiN | — | 310 | 695 | 543 | 1820 | 1245 | 7.9 |

Wherein:

Test 1: Processing of brake disks

Brake disks of cast iron GG26 were processed in continuous cutting.

Cutting speed $V_c = 600$ m/min.
Feed $f = 0.6$ mm/U
Cutting depth $ap = 4$ mm
Contact period/piece = 5.25 sec;
Geometry of indexable insert = SNGN 120430 T S is the number of brake disks (pieces) processed with one insert before it is worn by a land wear of $Vb_r = 0.3$ mm per cutting edge.

Test 2: Longitudinal turning

Shafts of cast iron GGG50 were longitudinally turned by interrupted cutting operation.

Cutting speed $V_c = 600$ m/min.
Feed $f = 0.6$ mm/U
Cutting depth $ap = 2$ mm
Geometry of indexable insert-SNGN 120412 T Edge Life is the time in minutes to reach a land wear of $Vb_r = 0.3$ mm at the cutting edge of the indexable insert.

Test 3: Facing

Hollow cylinders of cast iron GG25 having a hardness of 230 HB, an outer diameter of 110 mm, an inner diameter of 80 mm and a length of 200 mm were faced in the standard test.

Cutting speed $V_c = 678$-$907$ m/min.
Feed $f = 0.4$ mm/U
Cutting depth $ap = 2$ mm
Cutting plate geometry = SNGN 120412 T Edge life is the time in minutes to reach a land wear $Vb_r = 0.3$ mm at the cutting edge of the indexable insert.

The results of these tests 1 to 3 are compiled on Table 3.

TABLE 3

| Sample No. | Test 1 (S) in pieces | Test 2 edge life in minutes | Test 3 edge life in minutes |
|---|---|---|---|
| E 1 | 482 | 36 | 44 |
| V 1 | 178 | 13 | 12 |
| E 2 | 407 | 30 | 37 |
| V 2 | 207 | 3 | 9 |
| E 3 | 465 | 34 | 40 |
| V 3 | 192 | 9 | 10 |
| E 4 | 397 | 35 | 35 |
| V 4 | 180 | 11 | 11 |
| E 5 | 385 | 30 | 36 |
| V 5 | 281 | 14 | 11 |
| E 6 | 411 | 30 | 37 |
| V 6 | 104 | 2 | 7 |
| E 7 | 423 | 36 | 36 |
| V 7 | 256 | 11 | 8 |
| E 8 | 397 | 39 | 39 |
| V 8 | 199 | 7 | 8 |
| E 9 | 420 | 33 | 36 |
| V 9 | 164 | 1.5 | 4 |
| E 10 | 390 | 28 | 34 |
| E 11 | 399 | 28 | 34 |
| E 12 | 412 | 30 | 38 |
| E 13 | 421 | 32 | 49 |
| E 14 | 408 | 39 | 42 |
| E 15 | 400 | 39 | 41 |

As can be seen from the data in Table 3, with the sintered bodies E 1 to E 15, according to the invention, there are obtained in the three different machining tests of cast iron materials at the high cutting speed of 600 m/min a considerably higher number of brake disks of prolonged edge life than with the comparison samples V 1 to V 9.

Responsible for these better results are the crystalline "Gala" compounds detectably present in the sintered bodies according to the invention. The crystalline phases are only formed when crystalline "Gala" compounds prepared prior to the mixing are used in the starting powder mixture. It is especially clear from comparison of the results of sample $E_1$ with $V_1$ in which $Ga_2P_3$, $La_2O_3$ and $Al_2O_3$ powders were separately mixed with the $Si_3N_4$ starting powder prior to the sintering.

In view of the excellent properties, it is evident that the materials according to the invention can be used not only in machining technology but also, in general, as wear resistant materials in machine construction and industrial process engineering. The sintered bodies of the invention can be used in bearing technology, valve technology, pump technology, nozzle technology and high-temperature technology.

We claim:

1. Polycrystalline sintered bodies of great fracture toughness and hardness consisting essentially of at least 66% by weight of a crystalline silicon nitride phase, of which at least 90% by weight is present in the beta-modification, and up to 34% by weight of secondary, intergranular grain boundary phases based on oxides, carbides and/or nitrides, of which at least one is crystalline, and wherein at least 25% by weight of the intergranular, secondary grain boundary phases consists essentially of a quasi-ternary crystalline compound of $Ga_2O_3$—$La_2O_3$—$Al_2O_3$, the quantitative portions of which in % by mole in the ternary system $Ga_2O_3$—$La_2O_3$—$Al_2O_3$ are determined by the triangular surface with the corners $E_1 = 5\% Ga_2O_3$—$5\% La_2O_3$—$90\% Al_2O_3$
$E_2 = 90\% Ga_2O_3$—$5\% La_2O_3$—$5\% Al_2O_3$
$E_2 = 5\% Ga_2O_3$—$90\% La_2O_3$—$5\% Al_2O_3$ of the FIGURE, and the quasi-ternary crystalline compound is prepared from gallium oxide, lanthanum oxide and aluminum oxide prior to producing the polycrystalline sintered bodies and wherein at least 1% by weight of the sintered body is the quasi-ternary crystalline compound.

2. A process for the preparation of a polycrystalline sintered body according to claim 1 which comprises sintering a powder mixture of silicon nitride, oxide sintering additives and optionally carbide and/or nitride refractory admixtures, with or without application of pressure, at a temperature in the range of from 1700° to 2100° C., wherein a powder of quasi-ternary crystalline compounds of $Ga_2O_3$—$La_2O_3$—$Al_2O_3$, are present in the mixture as at least one sintering additive, the composition of said quasi-ternary crystalline compounds in % by mole in the ternary system $Ga_2O_3$—$La_2O_3$—$Al_2O_3$ are determined by the triangular surface with the corners $E_1 = 5\% Ga_2O_3$—$5\% La_2O_3$—$90\% Al_2O_3$
$E_2 = 90\% Ga_2O_3$—$5\% La_2O_3$—$5\% Al_2O_3$
$E_3 = 5\% Ga_2O_3$—$90\% La_2O_3$—$5\% Al_2O_3$ prior to forming the mixture to be sintered, the quasi-ternary compounds are prepared by heating to temperatures from 1500°–1850° C. a mixture of gallium oxide, lanthanum oxide and aluminum oxide in the above defined amounts.

3. A process for the preparation of a polycrystalline sintered body according to claim 2, wherein the powder mixture is a homogeneous mixture having an average particle size of less than 2 μm said mixture consisting essentially of at least 70% by weight silicon nitride, at least 80% by weight of the silicon nitride being in the alpha-modification, and wherein the impurities in the silicon nitride in the form of oxides and free carbon does not exceed 4.0% by weight, and up to 30% by weight of the quasi-ternary crystalline compounds in the $E_1$—$E_2$—$E_3$ triangle of the $Ga_2O_3$—$La_2O_3$—$Al_2O_3$ system alone or mixed with oxides and/or carbides and/or nitrides.

4. A process according to claim 3, wherein the quasi-ternary crystalline compounds are admixed with at least one oxide selected from the group consisting of crystalline silicates of natural origin, metal oxides of metal atoms from groups 2a and 3b of the Periodic System, including the lanthanides and aluminum and silicon-aluminum oxynitride.

5. A process according to claim 3, wherein the quasi-ternary crystalline compounds are admixed with at least one carbide selected from the group consisting of metal carbides of metal atoms from groups 4b, 5b and 6b of the Periodic System, boron, silicon and admixtures with at least one nitride selected from the group consisting of titanium nitride and titanium carbonitride.

6. A process according to claim 2 wherein the composition of the quasi-ternary crystalline compound is determined by the triangular surface corners
$E_{13} = 5\%Ga_2O_3$—$50\%La_2O_3$—$45\%Al_2O_3$
$E_{15} = 45\%Ga_2O_3$—$50\%La_2O_3$—$5\%Al_2O_3$
$E_{21} = 40\%Ga_2O_3$—$20\%La_2O_3$—$40\%Al_2O_3$.

7. A process according to claim 3 wherein the composition of the quasi-ternary crystalline compound is determined by the triangular surface corners
$E_{13} = 5\%Ga_2O_3$—$50\%La_2O_3$—$45\%Al_2O_3$
$E_{15} = 45\%Ga_2O_3$—$50\%La_2O_3$—$5\%Al_2O_3$
$E_{21} = 40\%Ga_2O_3$—$20\%La_2O_3$—$40\%Al_2O_3$.

8. A process according to claim 4 wherein the composition of the quasi-ternary crystalline compound is determined by the triangular surface corners
$E_{13} = 5\%Ga_2O_3$—$50\%La_2O_3$—$45\%Al_2O_3$
$E_{15} = 45\%Ga_2O_3$—$50\%La_2O_3$—$5\%Al_2O_3$
$E_{21} = 40\%Ga_2O_3$—$20\%La_2O_3$—$40\%Al_2O_3$.

9. A process according to claim 5 wherein the composition of the quasi-ternary crystalline compound is determined by the triangular surface corners
$E_{13} = 5\%Ga_2O_3$—$50\%La_2O_3$—$45\%Al_2O_3$
$E_{15} = 45\%Ga_2O_3$—$50\%La_2O_3$—$5\%Al_2O_3$
$E_{21} = 40\%Ga_2O_3$—$20\%La_2O_3$—$40\%Al_2O_3$.

10. A sintered body of claim 1 wherein the quasi-ternary crystalline body has a composition determined by the triangular surface with the corners
$E_{13} = 5\%Ga_2O_3$—$50\%La_2O_3$—$45\%Al_2O_3$
$E_{15} = 45\%Ga_2O_3$—$50\%La_2O_3$—$5\%Al_2O_3$
$E_{21} = 40\%Ga_2O_3$—$20\%La_2O_3$—$40\%Al_2O_3$.

* * * * *